United States Patent [19]

Lange et al.

[11] 4,358,076
[45] Nov. 9, 1982

[54] METHOD OF SUN AND EARTH ACQUISITION FOR THREE AXIS STABILIZED SATELLITES EQUIPPED WITH ACQUISITION SENSORS

[75] Inventors: Benjamin O. Lange, Sunnyvale, Calif.; Arnold Scheit, Munich, Fed. Rep. of Germany

[73] Assignee: Messerschmitt-Bölkow-Blohm GmbH, Munich, Fed. Rep. of Germany

[21] Appl. No.: 190,444

[22] Filed: Sep. 24, 1980

[30] Foreign Application Priority Data

Nov. 8, 1977 [DE] Fed. Rep. of Germany ....... 2749868

[51] Int. Cl.³ .............................................. B64G 1/36
[52] U.S. Cl. .................................. 244/164; 244/171; 244/176
[58] Field of Search ....................... 244/321, 164–167, 244/169, 171, 168, 176; 73/178 R; 364/434, 459

[56] References Cited

U.S. PATENT DOCUMENTS

| 3,206,141 | 9/1965 | Dryden | 244/169 |
| 3,429,524 | 2/1969 | Buckingham et al. | 244/166 |
| 3,439,884 | 4/1969 | Slater | 364/459 X |
| 3,547,381 | 12/1970 | Shaw et al. | 244/169 X |
| 4,071,211 | 1/1978 | Muhlfelder et al. | 244/165 |

OTHER PUBLICATIONS

Redisch, W. N., "ATS-6 Description and Performance, IEEE Trans. on Aerospace & Electronic Sys.", vol. AES-11, No. 6, pp. 994–1003, Nov. 1975.
Bittner et al., "The Attitude Determination and Control Subsys. of the Intelsat V Spacecraft", Proceedings of AOCS Conf., 11/3-6/77.

Primary Examiner—Galen L. Barefoot
Attorney, Agent, or Firm—Toren, McGeady & Stanger

[57] ABSTRACT

A method of sun and earth acquisition for satellites which are stabilized in three dimensions and are equipped with acquisition sensors is provided. The method enables the acquisition of the earth and sun to be concluded as quickly as possible. The method includes a series of cumulative or alternative steps for changing the attitude of the satellite relative to the sun. These attitude changes are governed by a simple set of control equations. An arrangement for effecting the method is also provided.

6 Claims, 2 Drawing Figures

METHOD OF SUN AND EARTH ACQUISITION FOR THREE AXIS STABILIZED SATELLITES EQUIPPED WITH ACQUISITION SENSORS

FIELD OF THE INVENTION

The invention relates to a method of sun and earth acquisition for satellites which are stabilized in three dimensions and are equipped with acquisition sensors.

BACKGROUND OF THE INVENTION

After being shot into its orbit, a satellite of the above-indicated type must be aligned with respect to earth and sun, particularly to optimize the antenna gain and the illumination of the solar cells.

In the known Symphony satellite (Symphonie-Satellit), see also the magazine Flugrevue 1/1975, pages 39–40, for the alignment of the satellite after reaching a quasi-synchronized orbit, the spin rate is reduced from about 120 rotations/minute to about 2 rotations/minute and the solar cell paddles are folded out. After a momentum wheel has been accelerated to normal speed, the spin rate is measured by means of solar sensors and, if necessary, is corrected by means of a cold-gas system. By means of another cold-gas pulse, the spin rate is further reduced and the z-axis is aligned relative to the earth while measuring or surveying with infrared sensors. The satellite is subsequently rotated about the z-axis until the x-axis is perpendicular relative to the plane of the trajectory. An additional fine sensor is used for the fine alignment of the satellite. To avoid the incidence of reflected light, the sensors are screened by means of light shields.

It is of significant importance for various reasons that the satellite concludes the acquisition maneuver as quickly as possible. The heat balance with respect to overheating as well as under-cooling does not allow the exposure of sensitive parts of the sun longer than intended, or to leave them in the shadow, otherwise an increase in the operational risk occurs. Also, it must be possible to use the solar cells as quickly as possible to meet the energy requirements, however, they should not cover the sensor heads. Accordingly, quick unfolding and alignment toward the sun are desired.

OBJECTS OF THE INVENTION

It is a primary object of the invention to provide an acquisition method which makes possible a quick and reliable transition of the satellite into its final position. A further object of the invention allows the use of simply constructed sensors, i.e., coarse solar sensors with not too large a field of view, and simple gyroscopes, and allows the use of simple control laws and of simple control logic. An additional object is to provide a sensor arrangement by means of which the method can be carried out.

SUMMARY OF THE INVENTION

The above objects are achieved by cumulative or alternative steps taking place in dependence on the attitude of the satellite relative to the sun. These steps are:

(a) when the $S_y$-component is missing, rotating the satellite about its x-axis, while damping the rotation about the y-axis and z-axis toward 0, until $S_y$ can be measured;

(b) when the $S_z$-component is missing and the $S_y$-component is measured, controlling the satellite about its x-axis in such a way that the sun remains in the x-z-plane, and rotating the satellite about the y-axis until $S_z$ can be measured while maintaining $\delta_z = 0$;

(c) when the $S_y$-component and the $S_z$-component are measured, controlling the $S_y$-component by regulating about the z-axis and controlling the $S_z$-component by regulating about the y-axis, and causing the satellite to rotate about a random axis within the linearity range of the sensors, measuring the z-component and the y-component in order to begin earth-seeking.

In order to effect the above method, the satellite has a set of three radiation sensor heads, one sensor head being arranged to point in the x-direction, and the other two sensor heads being arranged symmetrically with respect to the x-axis at an angle of $\beta$ relative to the x-axis.

For a better understanding of the present invention, reference is made to the following description and accompanying drawings while the scope of the invention will be pointed out in the appended claims.

DESCRIPTION OF THE PREFERRED EMBODIMENTS

Figure 1:
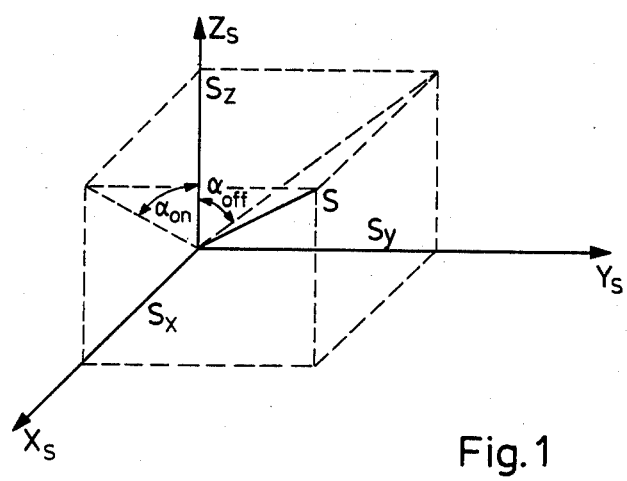
FIG. 1 shows the sensor coordinates.

According to FIG. 1, within the coordinate system which is fixed with respect to the sensor, the sun vector s is indicated by $$s = (s_x, s_y, s_z); \quad s = 1.0$$

Using z as the optic axis, the sensor measures the angle $\pm \alpha$ on (on-axis). The angle $\pm \alpha$ off (off-axis) is also of importance for the acquisition range of the sensor which results in a sensor of the known type which is equipped with cross-shaped slot diaphragms in a pyramidal range FOV (field of view), for example on-axis: $-35° \leq \alpha \text{on} \leq +35°$ off-axis: $-60° \leq \alpha \text{off} \leq +60°$ Sensors of this type are known such as those infrared sensors mentioned in the publication "Der Satellit Symphonie und sein Stabilisierungssystem," Raumfahrtforschung, January/February 1975 and in the article "The Attitude Determination and Control Subsystem of the Intelsat V Spacecraft," Proceedings of the AOCS Conference, 1977.

The fields of view of the sensors must be dimensioned, independent from the example, in dependence on the engines or thrust generators used in the concrete case in such a manner that the thrust that can be obtained is sufficient to stop the rotating satellite in the field of view of the sensor. However, in this connection, it must be taken into consideration that the FOV is not chosen too large, but approximately $2\pi$, since otherwise there is the danger of the incidence of scattered light or expensive shielding measures must be undertaken on the satellite.

The sun acquisition maneuver begins with the following values for the angular velocities about the three axes of the coordinate system which is fixed with respect to the satellite;

$\omega_x = 0.5°/\text{sec}, \omega_y = 0.5°/\text{sec}, \omega_z = 0°/\text{sec}.$ The permissible deviation from this initial condition is $\leq 0.13°/\text{sec}$. The initial position of the satellite with respect to the sun is purely accidental. The first step of the method to be carried out should perform the sun acquisition of the satellite within at most 40 minutes. For this purpose, the +x-axis or the −x-axis of the satellite are aligned toward the sun with the accuracy of less than 5° and a rotation of $0.5°/\text{sec} + 0.13°/\text{sec}$.

The individual procedures described in detail hereinafter have the effect that the x-axis remains continuously aligned toward the sun. In doing so, a thrust initiation of less than 1000 times per hour for which the propelling nozzle is switched on is maintained for each axis.

Starting from the coordinate system, which is fixed with respect to the satellite, with the sun vector $S = (S_x, S_y, S_z)$ depending on the position of the sun, three cumulative or also alternative steps can be distinguished in the acquisition maneuver.

These steps are:
1. The sun is outside of the field of view for measuring the $S_y$-component.

In this case, as a result of the acquisition control law, the satellite is caused to rotate about its x-axis with $\omega = 0.5°/\text{sec}$. $\omega_y$ and $\omega_z$ are damped toward zero. Since the field of view of the sensors covers more than half of the x-z-plane, this maneuver will have the effect that $S_y$ can be measured soon. This phase has the following control equations:

$M_x = -k_{Dx}(\omega_x - \omega_{cx})$ $M_y = -k_{Dy}\omega_y$ $M_z = -k_{Dz}\omega_z$ With $\omega_x, \omega_y, \omega_z$ as gyroscope measuring signals, $M_x, M_y, M_z$ as the jet torque, $k_{Dx}, k_{Dy}, k_{Dz}$ as constants and $\omega_{cx}$ as the rate BIAS about the x-axis.

2. The sun is in the x-z-plane in such a way that $S_y$ can be measured, but not $S_z$.

In this case, the control about the x-axis keeps the sun the x-z-plane. A rotation about the y-axis with $\omega_y = 0.5°/\text{sec}$, or $\omega_y = -0.5°/\text{sec}$ in the case that the negative x-axis is aligned toward the sun, brings the satellite, or the field of view of the sensor, into the position where it is able to measure $S_z$. $\omega_z$ is kept to zero during this phase.

The governing control equations are as follows:

$M_x = -k_{Dx}(\omega_x + k_{px}S_y)$ $M_y = -k_{Dy}(\omega_y - \omega_{cy})$ $M_z = -k_{Dz}\omega_z$ wherein $k_{px}$ is the attitude gain and $\omega_{cy}$ is the rate-BIAS about the y-axis.

3. $S_y$ as well as $S_z$ can be measured.

In this case, the control of the $S_y$-component is switched to the z-axis, the control of the $S_z$-component is carried out about the y-axis, and earth-seeking is started about the x-axis with $\omega_{cx} = 0.5°/\text{sec} \pm 0.13°/\text{sec}$.

The governing control equations are as follows:

$M_x = -k_{Dx}(\omega_x - \omega_{xc})$ $M_y = -k_{Dy}(\omega_y - k_{py}S_z)$ $M_z = -k_{Dz}(\omega_z + k_{pz}S_y)$ wherein $k_{py}, k_{pz}$ is the attitude gain and $\omega_{xc}$ is the rate of earth-seeking.

The sun acquisition is concluded with this step. The earth will soon appear in the field of view of the appropriate earth sensor, so that the acquisition maneuver can be concluded.

Figure 2:
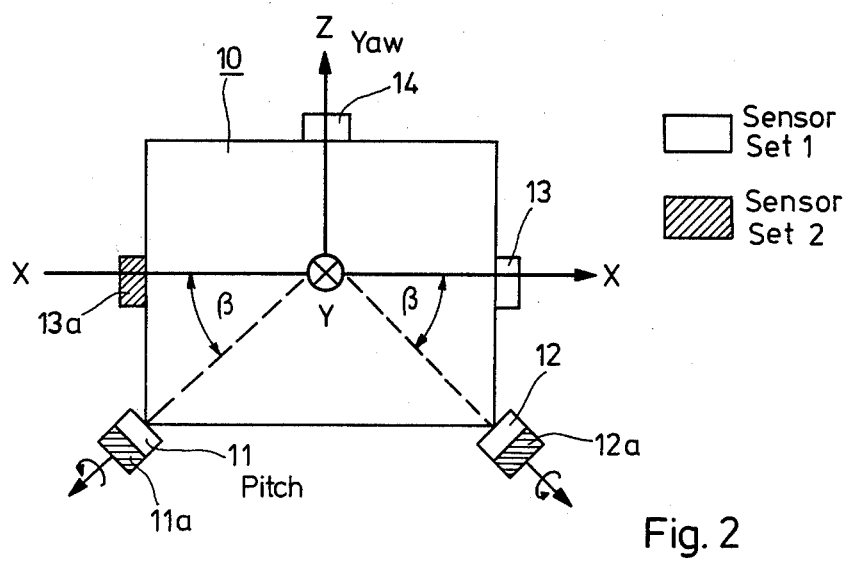
FIG. 2 shows the arrangement of sensors on the satellite.

FIG. 2 illustrates the suitable distribution of sensors on the satellite. The satellite 10 with x-y-z-axis, wherein the y-axis is in the plane of the drawing, is equipped with sensor heads 11, 12, 13. For redundancy reasons, three additional sensor heads 11a, 12a, 13a are provided as illustrated. An earth sensor 14 is arranged in the z-axis with the sensor head. The sensor heads 11, 11a and 12, 12a are swung about an angle of 45° relative to the x-axis.

The optic axes of the sensors 13, 13a for determining the $S_z$-component are:
sensor head 12 in the +x-axis: (1,0,0)
sensor head 12a in the −x-axis: (−1,0,0).

The optic axes in the x-z-plane of the sensors 11, 11a and 12, 12a for determining the $S_y$-component are:
sensor head 11, 11a: (−cos 45°, 0, −cos 45°)
sensor head 12, 12a: (cos 45°, 0, −cos 45°).

As already stated above, the FOV of the sensor is $|\alpha \text{on}| \leq 35°$ and $|\alpha \text{off}| \leq 60°$.

Since the sensor measures the angle $\alpha$ on and its output does not depend on $\alpha$ off, the following sensor output results:

Sensor output $= -1$ for $-35° \leq \alpha \text{ on} \leq -20°$ $= \alpha \text{ on} \cdot \frac{9}{\pi}$ for $-20° \leq \alpha \text{ on} \leq 20°$ $+1$ for $20° \leq \alpha \text{ on} \leq 35°$.

The inventive acquisition method can be realized by means of the arrangement of the sensors and their FOV as indicated in the example. Of course, also any other suitable arrangement for performing the method can be used, also depending on the configuration of the satellite.

The method is also suited to be used in the acquisition of reference locations other than earth and sun.

If necessary, the method also makes possible a reacquisition during the service life of the satellite.

As described above, it is particularly advantageous that only the absolutely necessary satellite maneuvers be carried out. Thus, fuel can be saved and an increase in payload and service life is possible. The method permits the use of sensor heads of the same type; accordingly, they can be exchanged before being such which leads to a reduction of the spare parts to be kept on the ground.

Systems for controlling the orientation of the satellite are well known from, for example, the publications "Der Satellit SYMPHONIE und sein Stabilisierungssystem" in RAUMFAHRTFORSCHUNG, January/February 1975, and "THE ATTITUDE DETERMINATION AND CONTROL SUBSYSTEM OF THE INTELSAT V SPACECRAFT" from the Proceedings of AOCS Conference held in Noordwijk, Oct. 3–6, 1977.

While the foregoing description and drawings represent the preferred embodiments of the present invention, it will be obvious to those skilled in the art that various changes and modifications may be made therein without departing from the true spirit and scope of the present invention.

What is claimed is:

1. A method of sun and earth acquisition for satellites which are stabilized in three dimensions (x, y and z axes) and are equipped with acquisition sensors, comprising the cumulative or alternative steps carried out in dependence on the position of the satellite relative to the sun (sun vector $S=(S_x, S_y, S_z)$), of:
   (a) when the $S_y$-component of the sun vector is not sensed, rotating the satellite about its x-axis at a rate $\omega_x$, while damping the rotation of the satellite about its y-axis and z-axis bringing the respective speeds around these axes $\omega_y$, $\omega_z$ toward zero, until $S_y$ can be measured;
   (b) when the $S_z$-component of the sun vector is not sensed and the $S_y$-component of the sun vector is measured, controlling the satellite about its x-axis in such a way that the sun remains in the x-z-plane, and rotating the satellite about the y-axis at a rate $\omega_y$ until $S_z$ can be measured, with $\omega_z=0$ being maintained; and
   (c) when the $S_y$-component and $S_z$-component are measured, controlling the $S_y$-component by regulating about the z-axis and controlling the $S_z$-component by regulating about the y-axis, and causing the satellite to rotate about a random axis in the linearity range of the sensors measuring the z-component and the y-component in order to start an earth-seeking mode of the satellite.

2. A method according to claim 1, including the antecedent step of aligning the x-axis of the satellite toward the sun and maintaining it in this position during the performance of the subsequent steps of the method.

3. A satellite control arrangement for sun and earth acquisition for satellites which are stabilized in three dimensions (x, y and z axes) comprising:
   a satellite body;
   a set of three radiation sensor heads, one sensor head being arranged to point in the x-direction; and the other two sensor heads being arranged symmetrically with respect to the x-axis at an angle of $\beta$ relative to said x-axis; and
   means for controlling the orientation of the satellite in dependence on the position of the satellite relative to the sun (sun vector $S=(S_x, S_y, S_z)$) as follows:
   (a) when the $S_y$-component of the sun vector is not sensed, rotating the satellite about its x-axis at a rate $\omega_x$, while damping the rotation of the satellite about its y-axis and z-axis bringing the respective speeds about such axes $\omega_x$, $\omega_z$ toward zero, until $S_y$ can be measured;
   (b) when the $S_z$-component of the sun vector is not sensed and the $S_y$-component is measured, controlling the satellite about its x-axis in such a way that the sun remains in the x-z plane, and rotating the satellite about the y-axis at a rate $\omega_y$ until $S_z$ can be measured, with $\omega_z=0$ being maintained; and
   (c) when the $S_y$-component are measured, controlling the S-component by regulating about the z-axis and controlling the $S_z$-component by regulating about the y-axis, and for causing the satellite to rotate about a random axis in the linearity range of the sensors measuring the z-component and the y-component in order to start an earth-seeking mode of the satellite.

4. The arrangement according to claim 3, wherein $\beta$ is 45°.

5. The arrangement according to claim 3, wherein another sensor head is arranged opposite said sensor head in x-direction, and also including additional sensor heads, each being parallel to a corresponding sensor head which is arranged at an angle relative to the x-axis.

6. The arrangement according to claim 3, wherein there is provided an earth sensor which is arranged on said satellite with its optic axis perpendicular relative to the axis of rotation of the earth axis.

* * * * *